United States Patent Office 2,999,886
Patented Sept. 12, 1961

2,999,886
STABLE SOLVENT COMPOSITIONS

Clarence R. Crabb, Lake Jackson, and Harris G. Hughes and Leighton S. McDonald, Angleton, Tex., assignors to The Dow Chemical Company, Midland, Mich., a corporation of Delaware
No Drawing. Filed Nov. 13, 1959, Ser. No. 852,620
7 Claims. (Cl. 260—652.5)

This invention relates to stable chlorinated hydrocarbon solvent compositions and to a method for preparing such compositions.

It is well known that chlorinated hydrocarbon solvents such as perchloroethylene and trichloroethylene undergo appreciable decomposition when subjected for even short periods of time to elevated temperatures, contact with oxygen, and exposure to natural daylight or sunlight. As a result of such decomposition, the solvents gradually darken in color and have corrosive effects on many metals with which they come in contact, particularly iron, copper, aluminum and zinc. The darkening in color and corrosive action of the partly decomposed solvents thus impairs their utility in various applications, such as dry cleaning and metal degreasing.

Although the decomposition products of the solvents are several, hydrochloric acid has been found to be the most damaging because of its highly corrosive action on various metals. Other identified decomposition products include carbon monoxide, phosgene, and acyl chlorides.

However, it has now been found that chlorinated hydrocarbon solvents are effectively stabilized against decomposition by incorporating into them an amount, sufficient to effect stabilization, of a sulfur-containing compound having the formula:

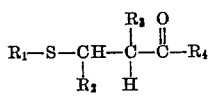

wherein $R_1$, $R_2$, and $R_3$ are each selected from the class consisting of hydrogen and a lower alkyl group having from 1 to 2 carbon atoms and $R_4$ is selected from the group consisting of hydrogen and an alkyl group having from 1 to 5 carbon atoms. The preferred concentration of stabilizer in the solvent is from about 0.001 percent to about 1 percent by weight, although amounts less than 0.001 percent will have some inhibiting effect. A concentration significantly greater than 1 percent by weight offers no great increase in inhibition of the decomposition of the solvent and increases the inhibitor cost correspondingly.

The practice of the present invention is illustrated by the following series of experiments:

Weighed amounts of stabilizer were added to each of a series of 500-ml. Erlenmeyer flasks containing 200 ml. of perchloroethylene. Each flask was placed directly above a standard 150 watt light bulb and fitted with a water-cooled condenser. Oxygen tubes were positioned so that they ran down through each condenser and into the solvent. The test samples were then heated to reflux temperature and oxygen was bubbled through the solvent at a rate of 10–15 bubbles per minute. After 48 hours, the samples were removed and the solvent titrated with standard sodium hydroxide to determine the acidity formed, which is expressed as per cent hydrochloric acid. In Table I there is shown the concentration of the stabilizer used and the percent HCl present at the end of the run.

Table I

| Percent by Weight of Stabilizer | Percent HCl by Weight |
|---|---|
| None | 0.8540 |
| 0.05 3-Methyl-4-(methylthio)-2-butanone | 0.0043 |
| 0.025 3-Methyl-4-(methylthio)-2-butanone | 0.0045 |
| 0.01 3-Methyl-4-(methylthio)-2-butanone | 0.0042 |
| 0.005 3-Methyl-4-(methylthio)-2-butanone | 0.0045 |
| 0.025 3-Methyl-4-(methylthio)-2-butanone | 0.0072 |
| 0.001 3-Methyl-4-(methylthio)-2-butanone | 0.5000 |
| 0.010 4-(methylthio)-2-butanone | 0.0043 |
| 0.020 2-Methyl-3-(methylthio)propionaldehyde | 0.0042 |
| 0.010 2-Methyl-3-(methylthio)propionaldehyde | 0.0047 |
| 0.005 2-Methyl-3-(methylthio)propionaldehyde | 0.2100 |
| 0.0025 2-Methyl-3-(methylthio)propionaldehyde | 0.4100 |

The compositions of the present invention are thus effectively stabilized against decomposition and represent a distinct improvement over unstabilized chlorinated hydrocarbon solvents in that corrosion of contiguous metallic surfaces is minimized, darkening of the solvent is substantially prevented, and the compositions have valuable utility in various applications such as dry cleaning, metal degreasing, and solvent extraction.

In a similar manner, other chlorinated hydrocarbon solvents, such as trichloroethylene, chloroform, and the like, are effectively stabilized against decomposition by incorporation of inhibitors from the class disclosed hereinbefore.

We claim:

1. A composition comprising a chlorinated hydrocarbon solvent and an amount, sufficient to improve the stability of said solvent, of a sulfur-containing compound having the formula:

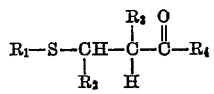

wherein $R_1$, $R_2$, and $R_3$ are each selected from the class consisting of hydrogen and a lower alkyl group having from 1 to 2 carbon atoms and $R_4$ is selected from the group consisting of hydrogen and an alkyl group having from 1 to 5 carbon atoms.

2. A composition as in claim 1 wherein the sulfur-containing compound is present in a concentration of from about 0.001 percent to about 1 percent by weight.

3. A composition as in claim 1 wherein the solvent is perchloroethylene.

4. A composition as in claim 1 wherein the sulfur-containing is 3-methyl-4-(methylthio)-2-butanone.

5. A composition as in claim 1 wherein the sulfur-containing is 4-(methylthio)-2-butanone.

6. A composition as in claim 1 wherein the sulfur containing is 2-methyl-3-(methylthio)propionaldehyde.

7. A method of stabilizing chlorinated hydrocarbon solvents comprising adding to said solvent an amount, sufficient to effect stabilization, of a sulfur-containing compound of the class defined in claim 1.

References Cited in the file of this patent

UNITED STATES PATENTS

| 1,151,255 | Ferguson | Aug. 24, 1915 |
| 1,917,073 | Stewart et al. | July 4, 1933 |
| 2,043,257 | Missbach | June 9, 1936 |
| 2,407,396 | Brubaker | Sept. 10, 1946 |
| 2,427,116 | Barrick | Sept. 9, 1947 |
| 2,570,050 | Eby | Oct. 2, 1951 |